United States Patent
Uchida et al.

[11] Patent Number: 5,877,733
[45] Date of Patent: Mar. 2, 1999

[54] LIQUID CRYSTAL DISPLAY DEVICE AND RADIO RECEPTION APPARATUS PROVIDED WITH SAME

[75] Inventors: Shigeru Uchida; Terufumi Hino, both of Higashihiroshima, Japan

[73] Assignee: Sharp Kabushiki Kaisha, Osaka, Japan

[21] Appl. No.: 698,696

[22] Filed: Aug. 16, 1996

[30] Foreign Application Priority Data

Nov. 1, 1995 [JP] Japan .................... 7-285055

[51] Int. Cl.$^6$ ............. G09G 5/00; G09G 3/04; G09G 3/18; H04B 1/18
[52] U.S. Cl. ................ 345/52; 345/4; 345/33; 345/50; 345/51; 455/158.2; 455/158.4; 455/158.5
[58] Field of Search ............ 345/94, 87, 50–53, 345/103; 455/45, 158.4, 158.5

[56] References Cited

U.S. PATENT DOCUMENTS

| | | |
|---|---|---|
| 5,001,468 | 3/1991 | Brice et al. . |
| 5,189,632 | 2/1993 | Paajanen et al. .......... 364/705.05 |
| 5,214,792 | 5/1993 | Alwadish ..................... 455/45 |
| 5,218,352 | 6/1993 | Endoh et al. ................. 345/87 |
| 5,497,372 | 3/1996 | Nankoh et al. ............ 455/158.4 |
| 5,584,051 | 12/1996 | Goken ......................... 455/45 |

FOREIGN PATENT DOCUMENTS

| | | |
|---|---|---|
| 0306403 | 8/1989 | European Pat. Off. . |
| 0114220 | 2/1993 | Japan . |
| 6-167942 | 6/1994 | Japan . |
| 9014721 | 11/1990 | WIPO . |

*Primary Examiner*—Steven J. Saras
*Assistant Examiner*—David L Lewis

[57] ABSTRACT

The invention is directed to simultaneously implement display by using the first and second liquid crystal display sections. While a voltage (½ $V_L$) which is a half of a drive voltage $V_L$ supplied from the second drive power supply by the second liquid crystal driver is taken as a virtual ground, a voltage (¼ $V_L$) resulting from positively and negatively dividing by 4 the drive voltage $V_L$ is applied to each of electrodes of the second liquid crystal display section defined in the liquid crystal display panel. In a selected waveform, by applying a voltage which exceeds the saturation voltage of liquid crystals, to selected portions of the waveform, the liquid crystals are turned on. In a non-selected waveform, such a voltage is not applied. In the second liquid crystal display section, direct current component of the waveform of a signal supplied by the second liquid crystal driver is cut off by the direct current cutoff circuit. A bias voltage (½ $V_H$) generated by the bias circuit is added to an output with the direct current component cut off. The resulting signal is applied to each of electrodes of the second liquid crystal display section.

20 Claims, 6 Drawing Sheets

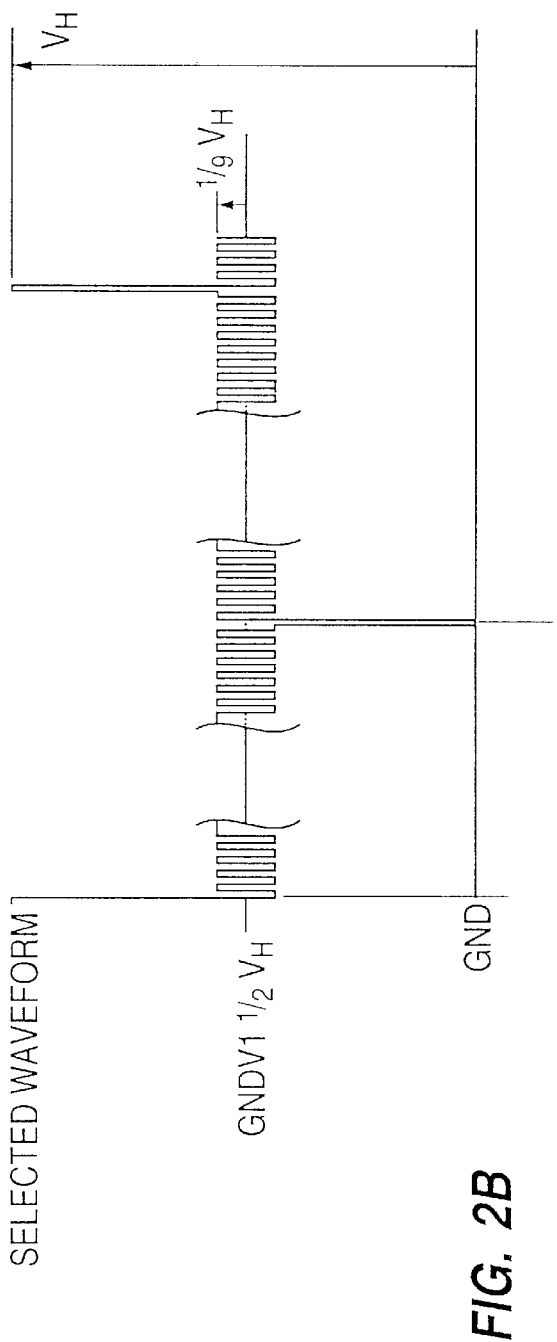
FIG. 2A  (1/68 DUTY RATIO, 1/9 BIAS)
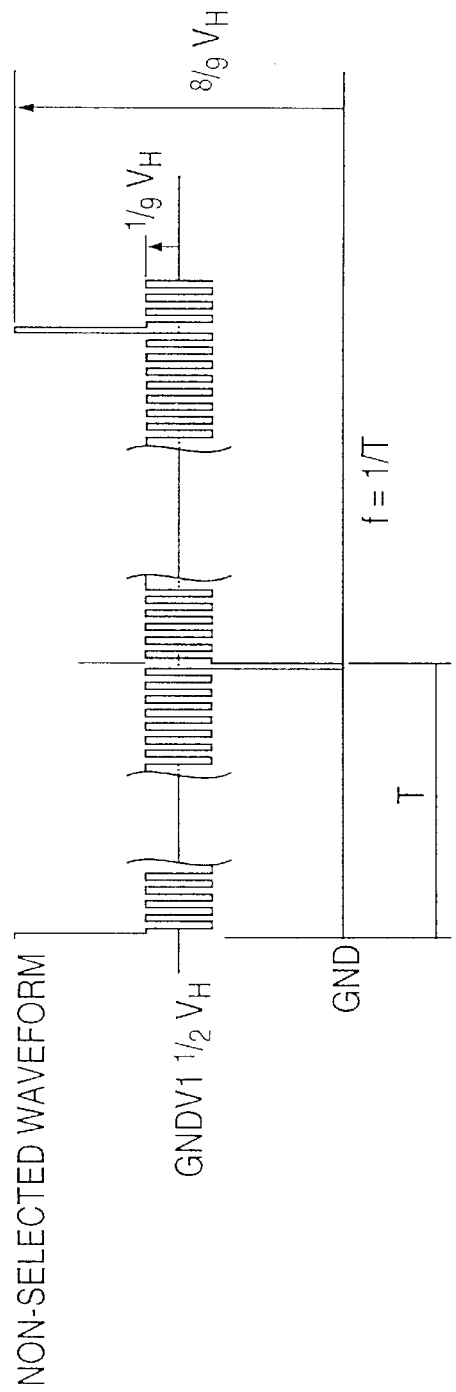
FIG. 2B

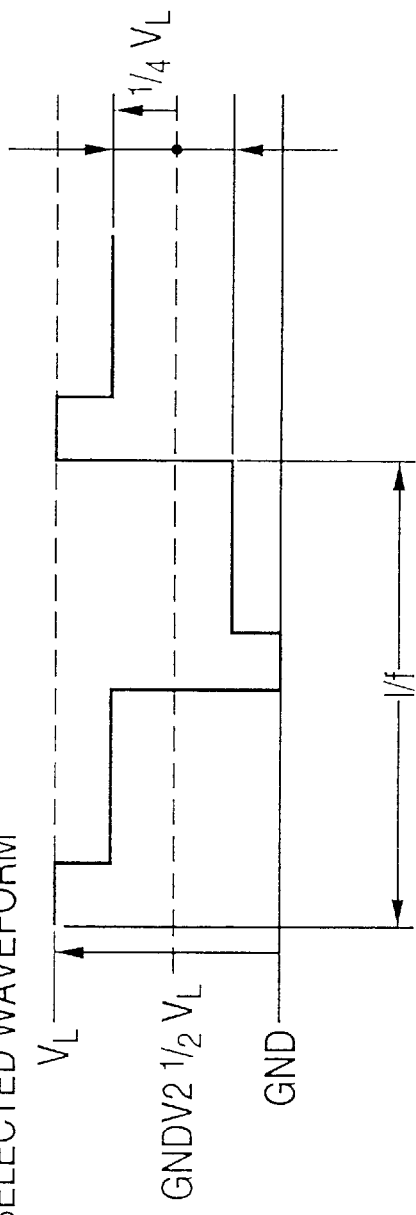
FIG. 3A (1/4 DUTY RATIO, 1/2 BIAS) SELECTED WAVEFORM
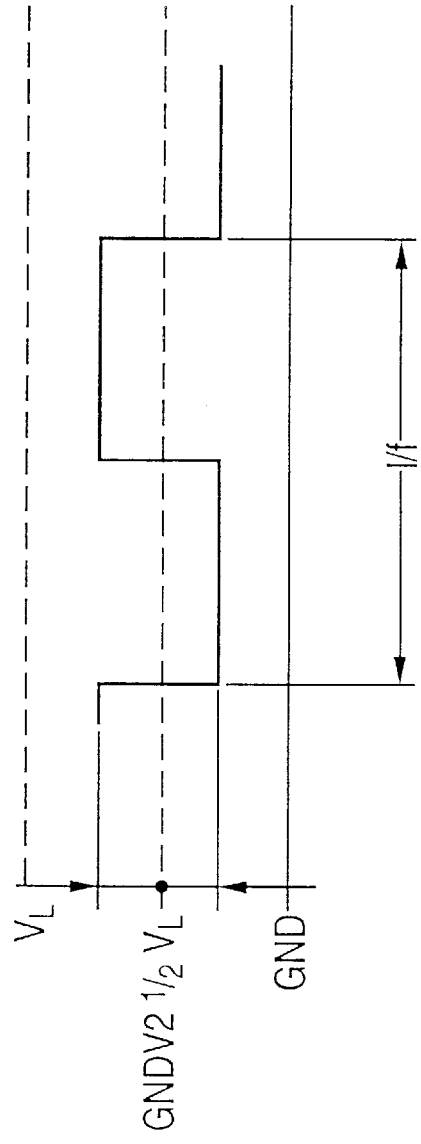
FIG. 3B NON-SELECTED WAVEFORM

LIQUID CRYSTAL DISPLAY DEVICE AND RADIO RECEPTION APPARATUS PROVIDED WITH SAME

BACKGROUND OF THE INVENTION

1. Field of the Invention

The present invention relates to a liquid crystal display device and a radio reception apparatus provided with the same.

2. Description of the Related Art

Hitherto two types of liquid crystal displays have been employed in liquid crystal display devices, which are the segment display type for displaying relatively simple data such as preset characters and numerals, and the dot matrix display type for displaying relatively complex characters and symbols by turning on and off the intersecting points of X- and Y-axes as dots. The segment display is driven by applying a low drive voltage, so that the duty ratio is low as well. By contrast, the dot matrix display involves a rather high duty ratio as well as a high drive voltage.

A variety of reception apparatuses have been developed which are capable of receiving signals in frequency modulation (FM) multiplex broadcasting which transmits character information by exploiting the remaining frequencies other than the transmission frequencies dedicated to audio information in FM broadcasting. One of those radio reception apparatuses which can receive FM multiplex broadcasting is such an apparatus comprising a liquid crystal display device of dot matrix display type as a display for displaying character information received in FM multiplex broadcasting.

However, in the conventional liquid crystal display devices, in which the drive voltage used for segment display and the drive voltage for dot matrix display are different from each other, when both segment display and dot matrix display are implemented with one and the same liquid crystal panel, the difference in drive voltage causes potential differences between electrodes which in turn cause positive and negative ions within the liquid crystals to adhere to the electrodes. As a result, a blackening/whitening phenomenon will occur, posing a problem of deteriorated display grade. For a solution of such a problem, if the drive voltage for the segment display is adjusted to the drive voltage for the dot matrix display, the display density in the segment display would be increased by a difference in duty ratio, resulting in a problem of an increased contrast difference between the segment display and the dot matrix display. To solve all these problems, it is necessary that the segment display and the dot matrix display be implemented by different liquid crystal panels correspondingly, or that a display section where the segment display is performed and a display section where the dot matrix display is performed are spaced to a large extent. In the former method, however, at least two liquid crystal panels would be involved so that the installation of liquid crystal panels would be restricted, in which case the equipment including these liquid crystal display devices would encounter problems in an equipment provided with such a liquid crystal device, such as deterioration in designability, upsizing and increase in failure rate. In the latter method, because of the need of using a larger liquid crystal panel and the occurrence of areas where the display is disabled in the liquid crystal panel, there would occur problems in an equipment provided with such as a liquid crystal display device, such as a deterioration in designability and upsizing.

In radio reception apparatus including the conventional liquid crystal display device, indeed character information received with a dot matrix display type liquid crystal display device during the reception of FM multiplex broadcasting, but the dot matrix display, if executed during the reception of amplitude modulation (AM) broadcasting, would be accompanied by generation of noise due to the voltage waveform of the drive voltage applied to the relevant display section. Moreover, since the fundamental waves of the frequency band of the noise are distributed over a wide range as broad as about 16 kHz to 48 kHz, and since a high drive voltage is involved, the resulting noise is so high that AM broadcasting using the frequency band of about 522 kHz to 1622 kHz would be greatly affected. Therefore, in this case, there is a problem that the dot matrix display cannot be executed while AM broadcasting is being received. Due to this, in the radio reception apparatus capable of receiving both FM multiplex broadcasting and AM broadcasting, the liquid crystal display device incorporated in the radio reception apparatus can be used only either during the reception of FM multiplex broadcasting or during the reception of FM broadcasting, such that effective use of the liquid crystal display device cannot be made. Actually, whereas frequency adjustment as well as recognition of the current broadcasting channel under reception can be readily accomplished by displaying the frequency band of current reception onto the liquid crystal display during the reception of FM multiplex broadcasting (FM broadcasting), the liquid crystal display cannot be used during the reception of AM broadcasting. Accordingly, a display section for adjustment needs to be provided independently, which would cause problems such as increase in size and deterioration in designability of an equipment provided with such a liquid crystal display device.

SUMMARY OF THE INVENTION

Hence an object of the invention is to provide a liquid crystal display device capable of simultaneously performing display using a first display section and display using a second display section with one and the same liquid crystal panel, and to provide a radio reception apparatus provided with the liquid crystal display device, capable of executing display using the liquid crystal display device during reception of AM broadcasting.

The present invention provides a liquid crystal display device comprising:

a single liquid crystal panel in which a first liquid crystal display section which is driven by applying a first drive signal having a predetermined first maximum amplitude $V_H$ and a second liquid crystal display section which is driven by applying a second drive signal having a predetermined second maximum amplitude $V_L$ smaller than the predetermined first maximum amplitude $V_H$ are integrated, a bias voltage adder for adding a bias voltage to the second drive signal applied to the second liquid crystal display section.

According to the invention, since a bias voltage derived from the bias voltage adding means is added to the second drive signal applied to the second liquid crystal display section, there will occur no potential differences between the electrodes of the first liquid crystal display section and the electrodes of the second liquid crystal display section. Thus, even when the first liquid crystal display section and the second liquid crystal display section which are integrated in the liquid crystal panel without being spaced apart from each other and are driven by different voltages from each other are simultaneously driven, the occurrence of the blackening/whitening phenomenon is prevented.

The invention is also characterized in that the liquid crystal display device further comprises:

a direct current cutoff unit means for cutting off a direct current component of the second drive signal applied to the second liquid crystal display section, wherein the bias voltage adder adds as a bias voltage a voltage of about a half of the maximum amplitude $V_H$ of the first drive signal applied to the first liquid crystal display section to a signal wherein a direct current component has been cut off by the direct current cutoff units.

According to the invention, the direct current component of the second drive signal applied to the second liquid crystal display section is cut off by the direct current cutoff unit, while a voltage of about a half of the maximum amplitude $V_H$ of the first drive signal applied to the first liquid crystal display section is generated by the bias voltage adder, which is added as a bias voltage to the signal in which the direct current component was cut off by the direct current cutoff unit. The second liquid crystal display section is driven by the resulting signal, and accordingly there will occur no potential differences between the electrodes of the first liquid crystal display section and the electrodes of the second liquid crystal display section. Accordingly, when the first liquid crystal display section and the second liquid crystal display section which are integrated in the liquid crystal panel without being spaced apart from each other and are driven by different voltages from each other are simultaneously driven, the occurrence of the blackening/whitening phenomenon is prevented.

The invention is also characterized in that the first liquid crystal display section performs dot matrix display and the second liquid crystal display section performs segment display.

According to the invention, since the bias voltage derived from the bias voltage adder is added to the second drive signal applied to the second liquid crystal display section which performs segment display, there will occur no potential differences between the electrodes of the first liquid crystal display section which performs dot matrix display and the electrodes of the second liquid crystal display section. Accordingly, when the first liquid crystal display section and the second liquid crystal display section which are integrated in the liquid crystal panel without being spaced apart from each other and are driven by different drive voltages from each other are simultaneously driven, the occurrence of the blackening/whitening phenomenon can be prevented.

As described above, according to the invention, in the liquid crystal panel in which the first liquid crystal display section which is driven by a higher drive voltage, and the second liquid crystal display section which is driven by a lower drive voltage are integratedly formed without being spaced apart from each other, the occurrence of blackening/whitening phenomenon in simultaneously driving the first and second liquid crystal display sections can be prevented. Accordingly, liquid crystal display sections which differ in drive voltage (duty ratio) can be formed in a relatively small single liquid crystal display panel. As a result, the equipment on which such a liquid crystal display device is mounted can be improved in designability and reduced in size.

The invention also provides a radio reception apparatus provided with the liquid crystal display device as described above, the radio reception apparatus comprising:

a frequency modulation multiplex signal receiver for receiving frequency modulation multiplex signals in which audio information and character/graphic or other information are multiplexed; and a control means for, upon reception of an FM multiplex signal by the FM multiplex signal receiver, controlling the liquid crystal display device to thereby enable the first liquid crystal display section to execute display, whereby the character/graphic or other information received by the FM multiplex signal receiver is displayed on the first liquid crystal display section while a reception band name, a reception frequency band, or the like are displayed on the second liquid crystal display section.

According to the invention, when an FM multiplex signal is received by the FM multiplex signal receiver, the control means controls the liquid crystal display device so that character/graphic or other information received by the FM multiplex signal receiver is displayed onto the first liquid crystal display section which is driven by a high-potential voltage being applied thereto. Thus, the character/graphic or other information transmitted by FM multiplex broadcasting can be displayed correctly in details.

As described above, according to the invention, information necessary for the reception of FM broadcasting such as reception band and reception frequency is displayed on the second liquid crystal display section of a low duty ratio (drive voltage), defined in the liquid crystal display panel, while character information received during the reception of an FM multiplex signal is displayed on the first liquid crystal display section of a high duty ratio (drive voltage), defined in the liquid crystal display panel. Therefore, the display of information necessary for the reception of FM broadcasting (operation of selecting a station, and the like) is executed with low power, and yet the character information received during the reception of the FM multiplex signal can be displayed on the liquid crystal display panel with clear characters.

The invention is also characterized in that the radio reception apparatus provided with a liquid crystal display device further comprises an operation unit for giving an instruction for display of character/graphic or other information, wherein when an instruction for the display of character/graphic or other information has been effected by the operation unit, the controller controls the liquid crystal display device to enable the first liquid crystal display section to execute display so that the character/graphic or other information received by the FM multiplex signal receiver is displayed on the first liquid crystal display section, and when no instruction for display of character/graphic or other information is effected by the operation unit, the controller controls the liquid crystal display device to halt application of a voltage to the first liquid crystal display section so that only the second liquid crystal display section is enabled to execute display.

According to the invention, when an instruction for display of character/graphic or other information is effected by the controller, the controller compels the first liquid crystal display section, which is driven by a high-potential voltage being applied thereto, to display the character/graphic or other information received by the FM multiplex signal receiver. When no instruction for display of character/graphic or other information is effected by the operation unit, the controller controls the liquid crystal display device to halt application of the high-potential voltage to the first liquid crystal display section so that information necessary for the reception of FM broadcasting (reception band, reception frequency, and the like) is displayed on the second liquid crystal display section which is driven by a low-potential voltage being applied thereto. Therefore, character/ graphic or other information transmitted by the FM multiplex broadcasting with an operation of the user can be displayed correctly in details. Moreover, while wasteful power consumption due to the driving of the first liquid crystal display section is prevented, information necessary for the reception of FM broadcasting can be displayed.

As seen above, according to the invention, information necessary for the reception of FM broadcasting such as reception band and reception frequency can be displayed on the second liquid crystal display section of a lower duty ratio (drive voltage), defined in the liquid crystal display panel, while the user is allowed to select the presence or absence of the display of character information (FM multiplex data) on the first liquid crystal display section defined in the liquid crystal display panel. Therefore, the display of information necessary for reception of FM broadcasting (operation of selecting a station, and the like) is executed with low power, and yet unnecessary character information which the user does not desire can be prevented from being displayed. Thus, the power consumed for the equipment is saved by suppressing the power consumption for driving the first liquid crystal display section, and additionally the FM broadcasting can be received reliably.

The invention is also characterized in that the radio receiver apparatus provided with a liquid crystal display device further comprises an amplitude modulation signal reception means for receiving an AM signal, wherein upon reception of an amplitude modulation signal by the amplitude modulation signal reception means, the controller controls the liquid crystal display device to halt application of a voltage to the first liquid crystal display section so that only the second liquid crystal display section is enabled to execute display.

According to the invention, when an FM multiplex signal is received by the FM multiplex signal receiver, the controller controls the liquid crystal display device so that the character/graphic or other information received by the FM multiplex signal receiver is displayed on the first liquid crystal display section which is driven by a high-voltage being applied thereto. When an AM signal is received by the AM signal receiver, the controller controls the liquid crystal display device to halt the application of a high-potential voltage to the first liquid crystal display section so that information necessary for reception of AM broadcasting is displayed on the second liquid crystal display section which is driven by a low-potential voltage being applied thereto. Therefore, during the reception of an FM signal, character/ graphic or other information transmitted by the FM multiplex signal can be displayed correctly in details on the first liquid crystal display section. During the reception of an AM signal, since the first liquid crystal display section is kept out of display, the possibility that the AM signal can no longer be received because of noise due to the driving of the first liquid crystal display section can be avoided. Information necessary for the reception of an AM signal can be displayed on the second liquid crystal display section.

The invention is also characterized in that the radio reception apparatus provided with the liquid crystal display device further comprises:

a amplitude modulation signal receiver for receiving an amplitude modulation signal; and controller for, upon reception of an amplitude modulation signal by the amplitude modulation signal receiver, controlling the liquid crystal display device to halt the application of a voltage to the first liquid crystal display section so that only the second liquid crystal display section is enabled to execute display, while a reception band name, a reception frequency band, or the like are displayed on the second liquid crystal display section.

According to the invention, when an AM signal is received by the AM signal receiver, the controller controls the liquid crystal display device to halt the application of a high-potential voltage to the first liquid crystal display section so that information necessary for the reception of an AM signal is displayed on the second liquid crystal display section which is driven by a low-potential voltage being applied thereto. Therefore, while the possibility that the AM signal can no longer be received because of noise due to the driving of the first liquid crystal display section can be avoided, information necessary for the reception of AM broadcasting can be displayed.

As described above, according to the invention, information necessary for the reception of AM broadcasting such as reception band and reception frequency is displayed on the second liquid crystal display section of a low duty ratio (drive voltage), defined in the liquid crystal display panel, while the driving of the first liquid crystal display section of a higher duty ratio (drive voltage), defined in the liquid crystal display panel is halted during the reception of AM broadcasting. Therefore, the display of information necessary for the reception of AM broadcasting (operation of selecting a station, and the like) is executed with low power, and yet the possibility that the AM broadcasting can no longer be received because of noise due to the driving of the first liquid crystal display section can be avoided. Thus, the power consumed for the equipment is saved by suppressing the power consumption for driving the first liquid crystal display section, and additionally the FM broadcasting can be received reliably.

BRIEF DESCRIPTION OF THE DRAWINGS

Other and further objects, features, and advantages of the invention will be more explicit from the following detailed description taken with reference to the drawings wherein:

FIGS. 2A and 2B are diagrams showing drive voltage waveforms of a first liquid crystal display section in the liquid crystal display device;

FIGS. 3A and 3B are diagrams showing drive voltage waveforms of a second liquid crystal display section in the liquid crystal display device;

DETAILED DESCRIPTION OF THE PREFERRED EMBODIMENTS

Figure 1:
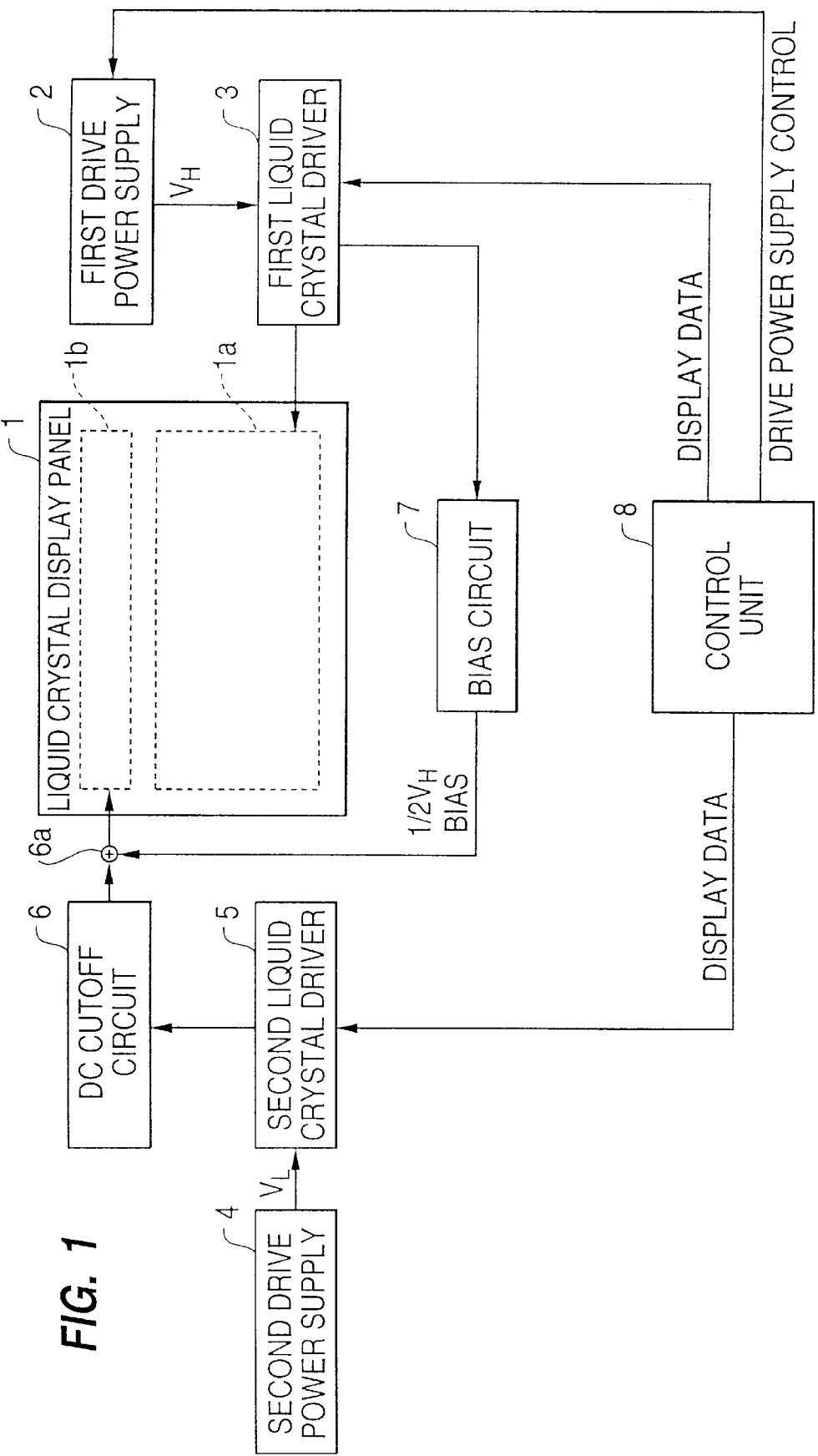
FIG. 1 is a schematic functional block diagram showing the electrical arrangement of a liquid crystal display device of an embodiment of the invention.

Now referring to the drawings, preferred embodiments of the invention are described below.

Figure 4:
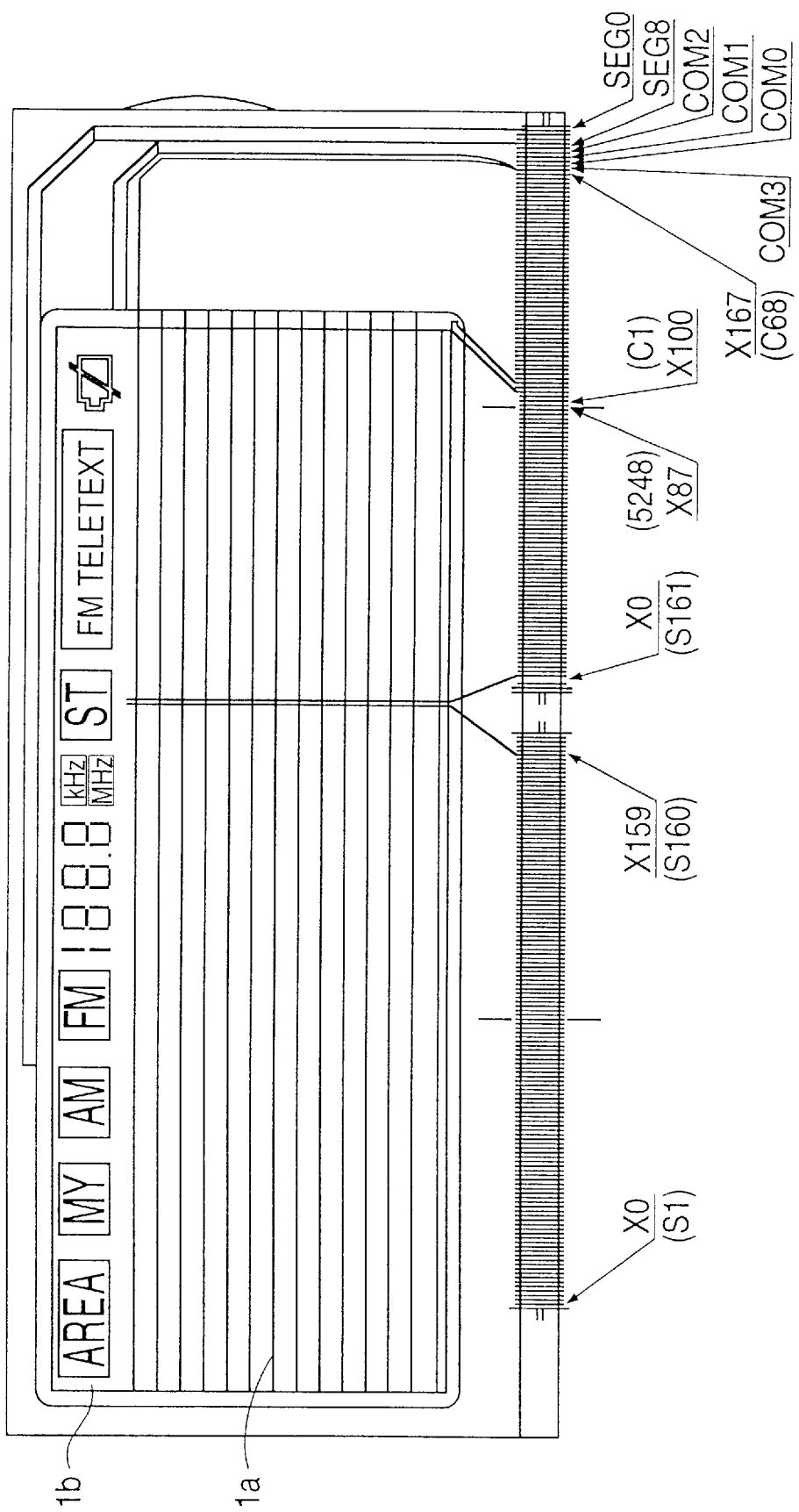
FIG. 4 is a plan view showing the structure of a liquid crystal panel in the liquid crystal display device.

FIG. 1 is a schematic functional block diagram showing the electrical arrangement of a liquid crystal display device of an embodiment of the present invention. FIGS. 2A and 2B show selected and non-selected waveforms of a drive voltage waveform of a first liquid crystal display section in the liquid crystal display device, respectively. FIGS. 3A and 3B show selected and non-selected waveforms of a drive voltage waveform of a second liquid crystal display section in the liquid crystal display device, respectively. FIG. 4 is a plan view showing the arrangement of a liquid crystal display panel in the liquid crystal display device.

Figure 5:
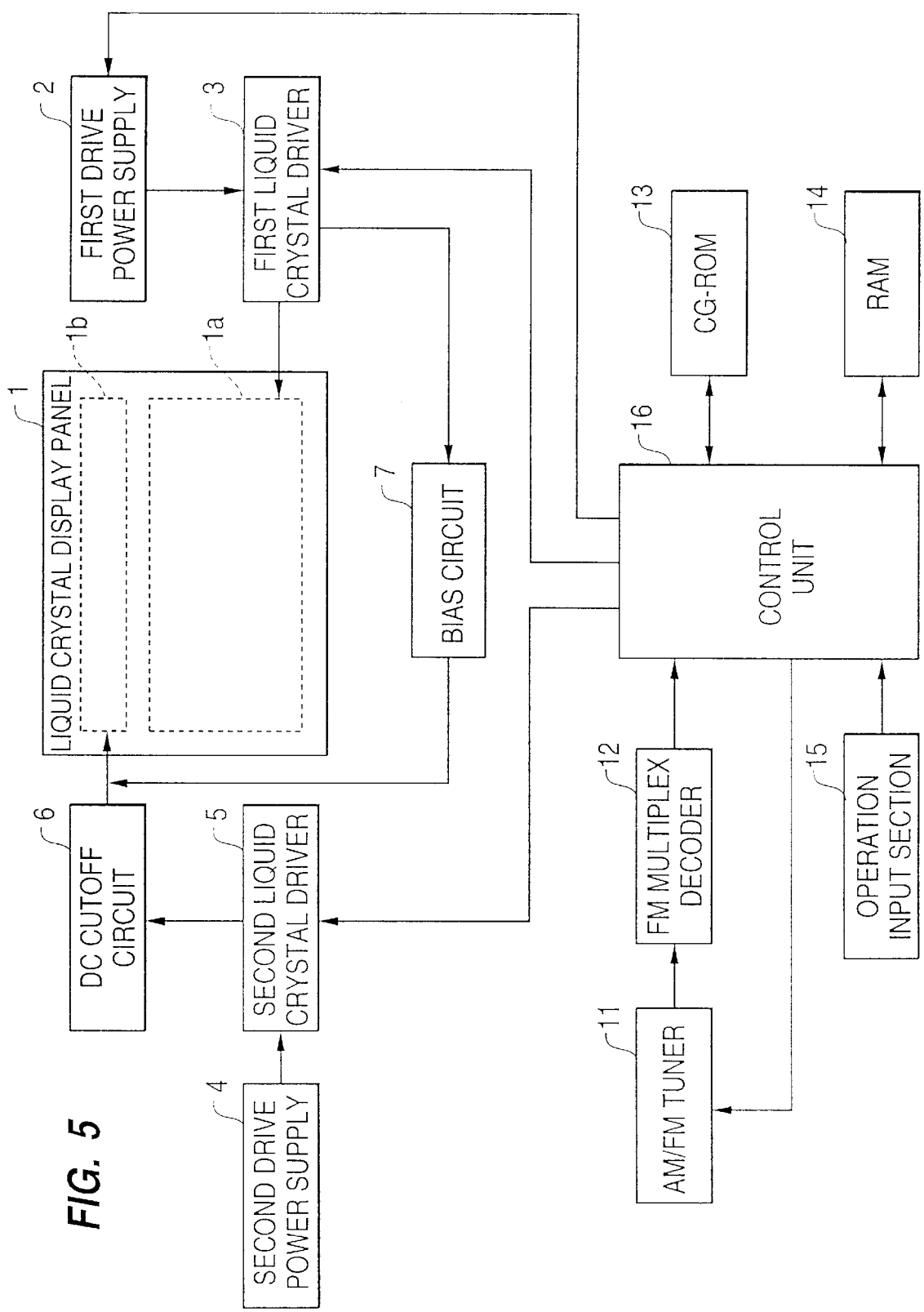
FIG. 5 is a schematic functional block diagram showing the electrical arrangement of a radio reception apparatus provided with the liquid crystal display device.
Figure 6A:
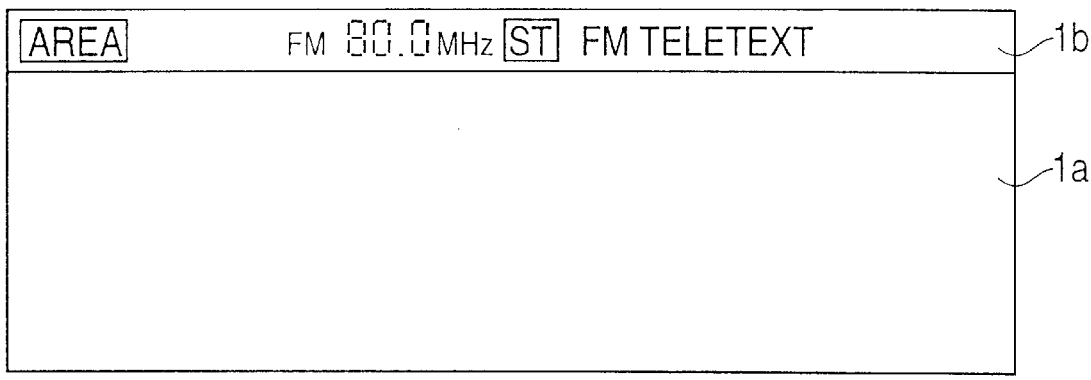
FIGS. 6A to 6C are plan views showing display examples in the radio reception apparatus.
Figure 6B:
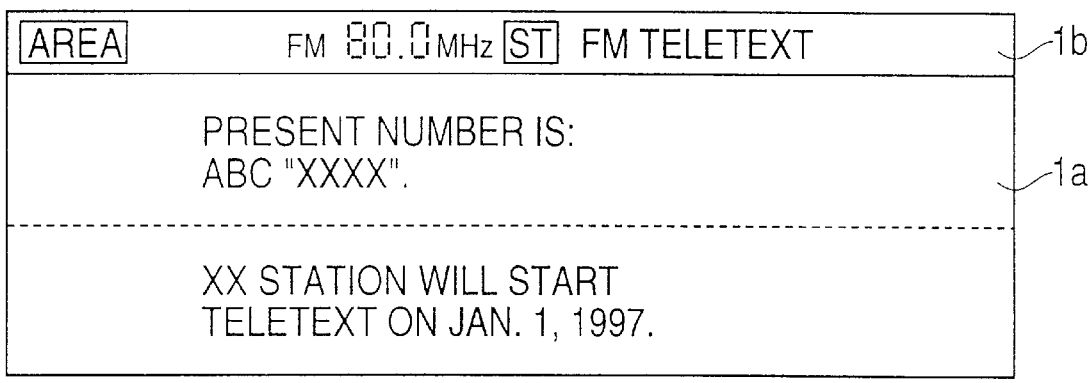
Figure 6C:
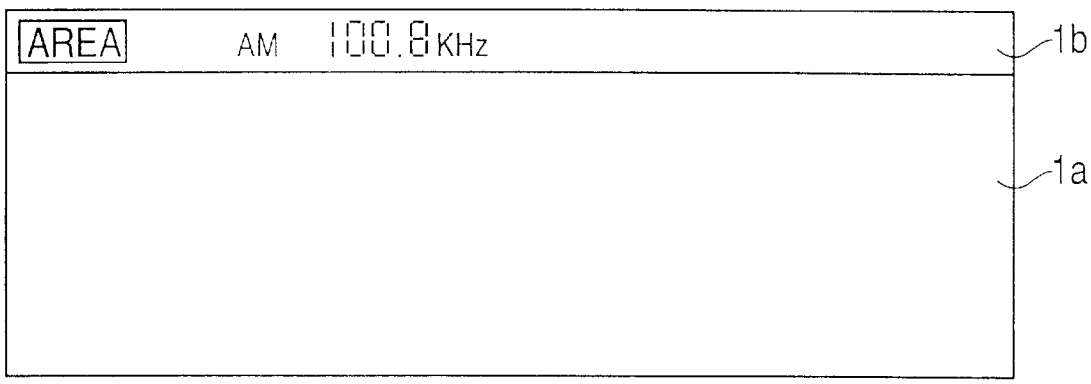

FIG. 5 is a schematic functional block diagram showing the electrical arrangement of a radio reception apparatus provided with the liquid crystal display device. FIG. 6A is a plan view showing a display example of the liquid crystal display device in the state of the radio reception apparatus that character information display is not performed during reception of FM multiplex broadcasting, FIG. 6B is a plan view showing a display example of the device in the state of device in the state of the radio reception apparatus that character information display is performed during reception of FM multiplex broadcasting, and FIG. 6C is a plan view showing a display example of the liquid crystal display device during reception of AM broadcasting.

The liquid crystal display device is first described with reference to FIGS. 1, 2A, 2B, 3A and 3B.

Referring to FIG. 1, a reference numeral 1 denotes a liquid crystal display panel comprising a first liquid crystal display section 1a for implementing display with a high voltage applied, and a second liquid crystal display section 1b for implementing display with a voltage lower than the voltage applied to the first liquid crystal display section 1a, the first liquid crystal display section 1a and the second liquid crystal display section 1b being integratedly formed. The first liquid crystal display section 1a is designed for dot matrix display, having a duty ratio of 1/68 and an optimum bias of ⅑. The second liquid crystal display section 1b is designed for segment display, having a duty ratio of ¼ and an optimum bias of ½.

A reference numeral 2 denotes a first drive power supply for supplying a drive voltage $V_H$ (about 9.5 V) for driving the first liquid crystal display section 1a formed in the liquid crystal display panel 1. A reference numeral 3 denotes a first liquid crystal driver for driving the display in the first liquid crystal display section 1a formed in the liquid crystal display panel 1 on the basis of the power supplied from the first drive power supply 2. A reference numeral 4 denotes a second drive power supply for supplying a drive voltage $V_L$ (about 2.5 V) for driving the second liquid crystal display section 1b formed in the liquid crystal display panel 1. A reference numeral 5 denotes a second liquid crystal driver for driving the display in the second liquid crystal display section 1b formed in the liquid crystal display panel 1 on the basis of the power supplied from the second drive power supply 4.

A reference numeral 6 denotes a direct current cutoff circuit for cutting off a direct current component of an output signal derived from the second liquid crystal driver 5. A reference numeral 7 denotes a bias circuit 7 for generating a bias voltage on the basis of the drive voltage $V_H$ derived from the first drive power supply 2. The generated bias voltage is applied to the output of the direct current cutoff circuit 6.

A reference numeral 8 denotes a control unit 8 for controlling a drive power supplied from the first drive power supply 2 on the basis of an instruction from external, as well as for controlling the display of the liquid crystal display panel 1 by transmitting display data to the first liquid crystal driver 3 and the second liquid crystal driver 5.

The liquid crystal display panel 1 is, for example, so constructed that a liquid crystal layer is sandwiched between a pair of substrates at least one of which has light transmitting property, and display electrodes are arranged on one side of each light transmitting substrate, confronting the liquid crystal layer. In addition, an orientation film which covers the electrodes may be formed. In the first liquid crystal display section 1a, which implements the dot matrix display, the display electrodes of the display section 1a are formed into strips, and arranged in such a manner that the electrodes on one substrate are perpendicular to the electrodes on the other substrate. In the second liquid crystal display section 1b, which implements the segment display, the display electrodes of the display section 1b are formed in such a manner that the electrodes on either one of the substrates are formed into segments, while the electrodes on the other substrate are formed over the nearly entire surface of the substrate.

In the liquid crystal display device constructed as described above, as shown in FIGS. 2A and 2B, a voltage (½ $V_H$, about 4.75 V) which is a half of the drive voltage $V_H$ supplied from the first drive power supply 2 by the first liquid crystal driver 3 is taken as a virtual ground GNDV1, and a signal of a voltage (⅑ $V_H$, about 1.06 V) which results from positively and negatively dividing by 9 the drive voltage $V_H$ is applied to the electrodes of the first liquid crystal display section 1a defined in the liquid crystal display panel 1. In the selected waveform shown in FIG. 2A, by applying a signal of a voltage ($V_H$/about 9.5 V) which exceeds the saturation voltage of liquid crystals in the selected portions, to the electrodes of the first liquid crystal display section 1a, the liquid crystals are turned on, that is, the liquid crystal molecules are oriented along the electric field direction. Meanwhile, in the non-selected waveform shown in FIG. 2B, a signal of a voltage (8/9 $V_H$, about 8.44 V) which does not exceed the saturation voltage of liquid crystals is applied to the electrodes of the first liquid crystal display section 1a.

That is, by applying a first drive signal whose maximum amplitude is the voltage $V_H$ to the first liquid crystal display section 1a, the first liquid crystal display section 1a is driven.

To the second liquid crystal display section 1b defined in the liquid crystal display panel 1 are applied the following signals. As shown in FIGS. 3A and 3B, a voltage (½ $V_L$) which is a half of the drive voltage $V_L$ supplied from the second drive power supply 4 by the second liquid crystal driver 5 is taken as a virtual ground GNDV2, and a signal of a voltage (¼ $V_L$) which results from positively and negatively dividing by 4 the drive voltage $V_L$ is applied to the electrodes of the second liquid crystal display section 1b. In the selected waveform shown in FIG. 3A, by applying a signal of a voltage ($V_L$) which exceeds the saturation voltage of liquid crystals in selected portions to the electrodes of the second liquid crystal display section 1b, the liquid crystals are turned on. Meanwhile, in the non-selected waveform shown in FIG. 3B, a signal of such a voltage ($V_L$) is not outputted.

That is, a second drive signal whose maximum amplitude is the voltage $V_L$ is outputted from the second liquid crystal driver 5.

Further, a direct current component of the signal outputted from the second liquid crystal driver 5 is cut off by the direct current cutoff circuit 6. A bias voltage (½ $V_H$, about 4.75 V) generated by the bias circuit 7 is added to the signal whose direct current component has been cut off, and then applied to the electrodes of the second liquid crystal display section 1b.

Assuming that the bias voltage generated by the bias circuit 7 is a half voltage of the voltage $V_H$, by applying a signal as shown in FIGS. 3A and 3B, where the virtual ground GNDV2 is ½ $V_H$, to the second liquid crystal display section 1b, the second liquid crystal display section 1b is driven.

Accordingly, even when the first liquid crystal display section 1a and the second liquid crystal display section 1b defined in the liquid crystal display panel 1 are driven simultaneously, the potentials of the drive voltages applied to the electrodes of the first and second liquid crystal display sections 1a and 1b are nearly equal, so that the blackening/ whitening phenomenon due to the deposition of positive and negative ions within liquid crystals which would result from potential differences between the first and second liquid crystal display section can be prevented. Moreover, since the potential difference between the first and second liquid crystal display sections has been eliminated by elevating the potential of the virtual ground voltage, the occurrence of contrast difference due to differences in the number of pixels thrown into display (duty ratio) can be prevented.

For the driving of only either the first liquid crystal display section 1a or the second liquid crystal display section 1b, shutting off the power supply for the liquid crystal display section which is not driven allows only one of these two sections to be displayed without affecting the electrodes of the non-driven side liquid crystal display section.

Next, a radio reception apparatus provided with the liquid crystal display device as described above is described with reference to FIGS. 4, 5, 6A, 6B and 6C.

In FIG. 5, like reference numerals are given like elements in conjunction with FIG. 1.

Referring to FIG. 5, a reference numeral 11 denoted an AM/FM tuner for receiving both AM and FM broadcasting, audio information transmitted in an AM or FM broadcast is signal-processed by an audio processing circuit (not shown) and then reproduced by, for example, a loudspeaker (not shown). A reference numeral 12 denotes an FM multiplex decoder for decoding FM multiplex data (character information) contained in the FM multiplex broadcast received by the AM/FM tuner 11. A reference numeral 13 denotes a CG-ROM for preparatorily storing kanjis (Chinese characters) or other kinds of characters and the like for displaying display data corresponding to information decoded by the FM multiplex decoder 12. A reference numeral 14 denotes a RAM for storing information decoded by the decoder 12 as well as unique broadcasting station name data and frequency data in one-to-one correspondence. A reference numeral 15 denotes an operation input section which is used to make a choice between AM and FM, a choice of a broadcasting station to be received, and a choice between the presence and absence of character information display. A reference numeral 16 denotes a control unit for controlling the changeover between AM and FM by the AM/FM tuner 11 according to a selection instruction via the operation input section 15, the preparation of display data by the use of the CG-ROM 13 and the RAM 14, and the station selection by the AM/FM tuner 11 on the basis of the broadcasting station name data and frequency data stored in the RAM 14. The control unit 16 also performs control operations similar to those performed by a control unit provided in the liquid crystal display device.

In the liquid crystal display panel 1, as shown in FIG. 4, are defined the first liquid crystal display section 1a for displaying character data received in the FM multiplex broadcasting by way of the dot matrix display, and the second liquid crystal display section 1b for implementing the display of preset AM/FM broadcasting bands and a received frequency by way of the segment display.

With regard to the radio reception apparatus provided with the liquid crystal display device constructed as described above, its operational control for reception of FM multiplex broadcasting is first explained.

With power on, when the user operates the operation input section 15 to give an instruction for reception of FM broadcasting (FM multiplex broadcasting) and choice a desired station, the control unit 16 controls the RAM 14 to read the previously stored station name data and frequency data, and further controls the AM/FM tuner 11 on the basis of the read data to receive the broadcasting station which the user desires.

The control unit 16 transmits display data representing the reception of FM broadcasting and display data representing a reception frequency, to the second liquid crystal driver 5 on the basis of the instruction for reception of FM broadcasting and the instruction for choice of a station by the operation input section 15. The second liquid crystal driver 5 generates a drive signal for driving the second liquid crystal display section 1b defined in the liquid crystal display panel 1 according to the display data by using the drive voltage $V_L$ derived from the second drive power supply 4. The direct current component of the drive signal is cut off by the direct current cutoff circuit 6. The bias circuit 7 is supplied with the drive voltage $V_H$ from the first drive power supply 2 and outputs, as a bias voltage, a voltage which is a half of the drive voltage $V_H$. The bias voltage is applied to the drive signal derived from the second liquid crystal driver 5, of which the direct current component has been cut off by the direct current cutoff circuit 6. By supplying the drive signal, to which the bias voltage has been applied, to the second liquid crystal display section 1b defined in the liquid crystal display panel 1, the second liquid crystal display section 1b defined in the liquid crystal display panel 1 is driven. As a result, data of FM reception frequencies and the like are displayed on the liquid crystal display panel 1 as shown in FIG. 6A.

In the case where teletext (character information broadcasting) is multiplexed in the received FM broadcasting, FM multiplexed data multiplexed in the FM multiplexed is received by the AM/FM tuner 11 and decoded by the FM multiplex decoder 12, and then fed to the control unit 16. The control unit 16 confirms the reception of the teletext, and resultantly stores the character information decoded by the FM multiplex decoder 12 into a specified region of the RAM 14. The control unit 16 also effectuates the display representing that the FM teletext is being received, in the second liquid crystal display section 1b defined in the liquid crystal display panel 1, through operational control similar to the foregoing.

When the user operates the operation input section 15 on the basis of the display in the second liquid crystal display section 1b representing that the FM broadcasting is being received to make an instruction for display of character information received by the teletext, the control unit 16 analyzes the character information stored in the RAM 14 to prepare document data. The control unit 16 makes the prepared document data into display data composed of kanjis and other kinds of characters on the basis of the kanjis and other characters stored in the CG-ROM 13, transmitting the display data to the first liquid crystal driver 3. By the display data being given, the first liquid crystal driver 3 generates a drive signal for driving the first liquid crystal display section 1a defined in the liquid crystal display panel 1 on the basis of the drive voltage $V_H$ derived from the first drive power supply 2, and feeds the drive signal to the first liquid crystal display section 1a. As a result, the first liquid crystal display section 1a defined in the liquid crystal display panel 1 is driven so that character display as shown in FIG. 6B is executed on the liquid crystal display panel 1 in addition to the display of reception frequency.

When no instruction for the display of character information is given by the operation input section 15 regardless of the fact that the display representing that FM character broadcasting is being received is executed in the second liquid crystal display section 1b, the control unit 16 will not apply to the first liquid crystal driver 3 the document data prepared in correspondence to the character information stored in the RAM 14, but put the first liquid crystal driver 3 into a halt. Then the first liquid crystal driver 3 stops generating such drive waveforms (selected waveform/non-selected waveform) as shown in FIGS. 2A and 2B, based on the drive voltage $V_H$ derived from the first drive power supply 2. As a result, nothing is displayed on the first liquid crystal display section 1a defined in the liquid crystal display panel 1.

Therefore, according to the operational control as described above, the display of reception band such as AM and FM as well as the display of reception frequency can be implemented in the second liquid crystal display section 1b, while the display of character information received by FM multiplex broadcasting can be implemented in the first liquid crystal display section 1a. Moreover, the user is allowed to select the presence or absence of character information display in the first liquid crystal display section 1a. Thus, any unnecessary display in the liquid crystal display panel 1 can be prevented.

In this embodiment, it has been arranged that during the reception of FM multiplex broadcasting, the display representing that FM multiplex broadcasting is being received is executed in the second liquid crystal display section 1b, where based on this display, the user is allowed to confirm the presence or absence of the character information display through the operation by the user. However, the invention being not limited to this arrangement, it is also possible, for example, that a menu screen is displayed in the first liquid crystal display section 1a upon the reception of FM multiplex broadcasting, where character information display in the first liquid crystal display section 1a will be halted by a user operation subsequent to the display.

Next the operational control for the reception of AM broadcasting is explained.

With power on, when the user operates the operation input section 15 to give an instruction for the reception of AM broadcasting or television broadcasting and choice a desired station, the control unit 16 controls the RAM 14 to read the previously stored station name data and frequency data, and further controls the AM/FM tuner 11 on the basis of the read data to receive the broadcasting station which the user desires.

The control unit 16 transmits display data representing the reception of AM broadcasting and display data representing a reception frequency, to the second liquid crystal driver 5 on the basis of the instruction for reception of AM broadcasting and the instruction for choice of a station by the operation input section 15. Moreover, the control unit 16 controls the first drive power supply 2 to apply the drive voltage $V_H$ to the bias circuit 7. As a result of this control, the second liquid crystal driver 5 generates a drive signal for driving the second liquid crystal display section 1b defined in the liquid crystal display panel 1 on the basis of the drive voltage $V_L$ derived from the second drive power supply 4. The direct current component of the drive signal is cut off by the direct current cutoff circuit 6. Meanwhile, a voltage resulting from halving the drive voltage $V_H$ derived from the first drive power supply 2 is applied by the bias circuit 7 to the drive signal derived from the second liquid crystal driver 5, of which the direct current component has been cut off by the direct current cutoff circuit 6. By supplying the drive signal, to which the bias voltage has been applied, to the second liquid crystal display section 1b defined in the liquid crystal display panel 1, the second liquid crystal display section 1b defined in the liquid crystal display panel 1 is driven. As a result, data of AM reception frequency is displayed on the liquid crystal display panel 1 as shown in FIG. 6C.

During the reception of AM broadcasting, when the control unit 16 does not provide to the first liquid crystal driver 3 with display data, but puts the first liquid crystal driver 3 into a halt, the first liquid crystal driver 3 stops generating such drive waveforms (selected waveform/non-selected waveform) as shown in FIGS. 2A and 2B, based on the drive voltage $V_H$ derived from the first drive power supply 2. As a result, nothing is displayed on the first liquid crystal display section 1a defined in the liquid crystal display panel 1.

Therefore, according to the operational control as described above, since the first liquid crystal display section 1a is not driven during the reception of AM broadcasting, such drive waveforms (selected waveform/non-selected waveform) as shown in FIGS. 2A and 2B are not generated, so that noise due to the generation of these drive waveforms is prevented from being generated. As a result, AM broadcasting can be received reliably and correctly. Also, since the display of reception bands such as AM and FM as well as the display of reception frequency are executed in the second liquid crystal display section 1b which is low in duty ratio, the operation of choosing an AM broadcasting station (frequency adjustment) can be easily accomplished without affecting the reception of AM broadcasting.

In this embodiment, the display in the second liquid crystal display section 1b defined in the liquid crystal display panel 1 has been implemented by segment display. However, the invention being not limited to this arrangement, for example, dot matrix which is small in the number of pixels (low in duty ratio) may be used, in which case the duty ratio of the second liquid crystal display section 1b may appropriately be set to such a value that noise generated when the second liquid crystal display section 1b is driven will be enough smaller than the reception frequency band of AM broadcasting.

In addition, the direct current cutoff circuit 6 can be implemented by a high-pass filter comprising a resistor and a capacitor. Otherwise, the direct current cutoff circuit 6 may be implemented by a transformer.

The bias circuit 7 can be implemented by using a resistor and a transistor in the bias method or self-bias method or the like.

The bias voltage, which has been given as one half of the voltage $V_H$ in this embodiment, may be approximately ½ $V_H$ without being limited to ½ $V_H$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:
a single liquid crystal panel in which a first liquid crystal display section which is driven by applying a first drive signal having a predetermined first maximum amplitude $V_H$ whenever said first liquid crystal display section is enabled to execute display and a second liquid crystal display section which is driven by applying a second drive signal having a predetermined second maximum amplitude $V_L$ smaller than the predetermined first maximum amplitude $V_H$ when said second liquid crystal display section is enabled to execute display and said first liquid crystal display section is not enabled to execute display, are integrated; and
bias voltage adding means for adding, when said first and second liquid crystal display sections are enabled to execute display simultaneously, a bias voltage to the second drive signal applied to the second liquid crystal display section.

2. The liquid crystal display device of claim 1, the liquid crystal display device further comprising:
direct current cutoff means for cutting off a direct current component of the second drive signal applied to the second liquid crystal display section,
wherein the bias voltage adding means adds as a bias voltage a voltage of about a half of the maximum amplitude $V_H$ of the first drive signal applied to the first liquid crystal display section to a signal wherein a direct current component has been cut off by the direct current cutoff means.

3. The liquid crystal display device of claim 2, wherein the first liquid crystal display section performs dot matrix display and the second liquid crystal display section performs segment display.

4. A radio reception apparatus provided with the liquid crystal display device of any one of claims 1 to 3, the radio reception apparatus comprising:
frequency modulation multiplex signal reception means for receiving frequency modulation multiplex signals in which audio information and character/graphic or other information are multiplexed; and
control means for, upon reception of an FM multiplex signal by the FM multiplex signal reception means, controlling the liquid crystal display device to thereby enable the first liquid crystal display section to execute display, whereby the character/graphic or other information received by the FM multiplex signal reception means is displayed on the first liquid crystal display section while a reception band name, a reception frequency band, or the like are displayed on the second liquid crystal display section.

5. The radio reception apparatus provided with a liquid crystal display device of claim 4, the radio reception apparatus further comprising:
operation means for giving an instruction for display of character/graphic or other information,
wherein, when an instruction for the display of character/graphic or other information has been effected by the operation means, the control means controls the liquid crystal display device to enable the first liquid crystal display section to execute display so that the character/graphic or other information received by the FM multiplex signal reception means is displayed on the first liquid crystal display section, and
when no instruction for display of character/graphic or other information is effected by the operation means, the control means controls the liquid crystal display device to halt application of a voltage to the first liquid crystal display section so that only the second liquid crystal display section is enabled to execute display.

6. The radio reception apparatus provided with a liquid crystal display device of claim 4, the radio reception apparatus further comprising:
amplitude modulation signal reception means for receiving an AM signal,
wherein upon reception of an amplitude modulation signal by the amplitude modulation signal reception means, the control means controls the liquid crystal display device to halt application of a voltage to the first liquid crystal display section so that only the second liquid crystal display section is enabled to execute display.

7. A radio reception apparatus provided with the liquid crystal display device of any one of claims 1 to 3, the radio reception apparatus comprising:
amplitude modulation signal reception means for receiving an amplitude modulation signal; and
control means for, upon reception of an amplitude modulation signal by the amplitude modulation signal reception means, controlling the liquid crystal display device to halt the application of a voltage to the first liquid crystal display section so that only the second liquid crystal display section is enabled to execute display, while a reception band name, a reception frequency band, or the like are displayed on the second liquid crystal display section.

8. The radio reception apparatus provided with a liquid crystal display device of claim 5, the radio reception apparatus further comprising:
amplitude modulation signal reception means for receiving an AM signal,
wherein upon reception of an amplitude modulation signal by the amplitude modulation signal reception means, the control means controls the liquid crystal display device to halt application of a voltage to the first liquid crystal display section so that only the second liquid crystal display section is enabled to execute display.

9. A method for reducing a potential difference between electrodes of a first type of liquid crystal display section and electrodes of a second type of liquid crystal display section when both display sections are enabled to execute display simultaneously, said first type of liquid crystal display section being driven by a first voltage whenever enabled to execute display and said second type of liquid crystal display section being driven by a second voltage, which is less than a first voltage, when said second type of liquid crystal display section is enabled to execute display and said first type of liquid crystal display section is not enabled to execute display, said first and second types of liquid crystal display sections being integrated together, comprising:
generating a bias voltage;
adding the bias voltage to said second voltage to form a sum voltage; and
applying said sum voltage to said electrodes of said second type of liquid crystal display section, thereby reducing said potential difference.

10. The method of claim 9, wherein said generating of the bias voltage is in accordance with the first voltage.

11. The method of claim 10, further comprising cutting off a direct current component of the second drive signal applied to the second type of liquid crystal display section, wherein said generating includes dividing the first voltage for use as the bias voltage when the direct current component has been cut off.

12. The method of claim 9, further comprising:

receiving frequency modulation multiplex signals in which information is multiplexed; and enabling, upon reception of an FM multiplex signal, the first type of liquid crystal display section to display information contained within the FM multiplex signal and the second type of liquid crystal display section to display information regarding the FM multiplex signal.

13. The method of claim 9, further comprising:

providing an AM receiver; and halting enabling execution of display of the first type of liquid crystal display section when an AM signal is received by the AM receiver, so that only the second type of liquid crystal display section is enabled to execute display.

14. A liquid crystal display device comprising:

a single liquid crystal panel including a first type of liquid crystal display section and a second type of liquid crystal display section, different from said first type of liquid crystal display section;

means for supplying a first drive signal having a predetermined first maximum amplitude $V_H$ to said first type of liquid crystal section whenever said first type of liquid crystal display section is enabled to execute display and means for supplying a second drive signal having a predetermined second maximum amplitude $V_L$ smaller than the predetermined first maximum amplitude $V_H$ to said second type of liquid crystal section when said second type of liquid crystal display section is enabled to execute display and said first type of liquid crystal display section is not enabled to execute display; and bias voltage adding means for adding, when said first and second types of liquid crystal display sections are enabled to execute display simultaneously, a bias voltage to the second drive signal supplied to the second type of liquid crystal display section and for applying a resultant sum to the second type of liquid crystal display section.

15. The device of claim 14, wherein said first type of liquid crystal display section is a dot matrix display and said second type of liquid crystal display section is a segment display.

16. The device of claim 14, further comprising:

direct current cutoff means for cutting off a direct current component of the second drive signal applied to the second liquid crystal display section, wherein the resultant sum is applied to the second type of liquid crystal display section when the direct current component has been cut off by the direct current cutoff means.

17. The device of claim 16, wherein the bias voltage is a voltage of about a half of the maximum amplitude $V_H$ of the first drive signal applied to the first liquid crystal display section.

18. The device of claim 14, further comprising:

a frequency modulation multiplex signal receiver for receiving frequency modulation multiplex signals in which information is multiplexed; and control means for, upon reception of an FM multiplex signal by the FM multiplex signal reception means, controlling the liquid crystal display device to display information within the FM multiplex signal on the first type of liquid crystal display section and to display information regarding the FM multiplex signal itself on the second type of liquid crystal display section.

19. The device of claim 18, further comprising:

operation means for giving an instruction for display of information within the FM signal, wherein, when an instruction for the display of information within the FM signal has been effected by the operation means, the control means controls the liquid crystal display device so that information within the FM multiplex signal is displayed on the first liquid crystal display section, and when no instruction for display of information within the FM signal is effected by the operation means, the control means controls the liquid crystal display device to halt application of a voltage to the first liquid crystal display section so that only the second liquid crystal display section is enabled to execute display.

20. The device of claim 14, further comprising:

an amplitude modulation signal receiver for receiving an AM signal, wherein upon reception of an amplitude modulation signal by the amplitude modulation signal reception means, the control means controls the liquid crystal display device to halt application of a voltage to the first liquid crystal display section so that only the second liquid crystal display section is enabled to execute display.

* * * * *